April 14, 1953 R. P. TRAUTNER 2,634,875
HOIST
Filed Sept. 8, 1950 3 Sheets-Sheet 1
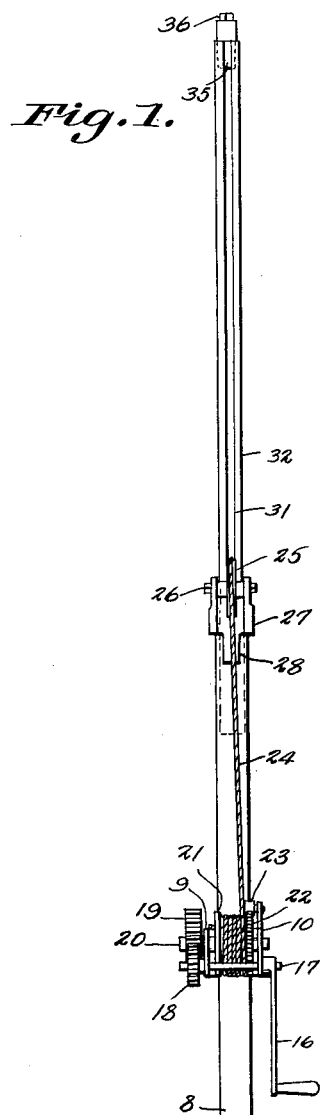
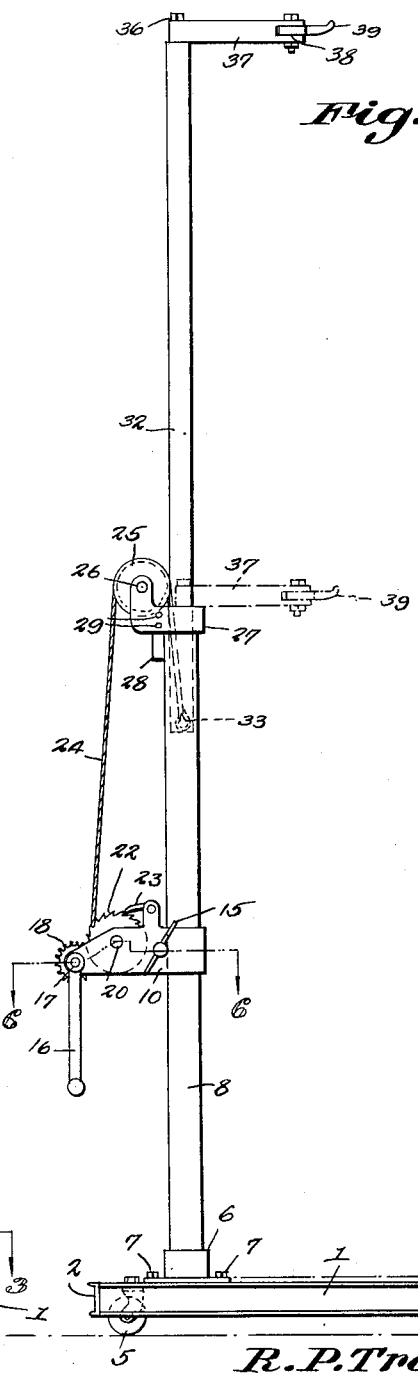
R. P. Trautner
INVENTOR
BY C. A. Snow & Co.
ATTORNEYS.

April 14, 1953 R. P. TRAUTNER 2,634,875
HOIST
Filed Sept. 8, 1950 3 Sheets-Sheet 2
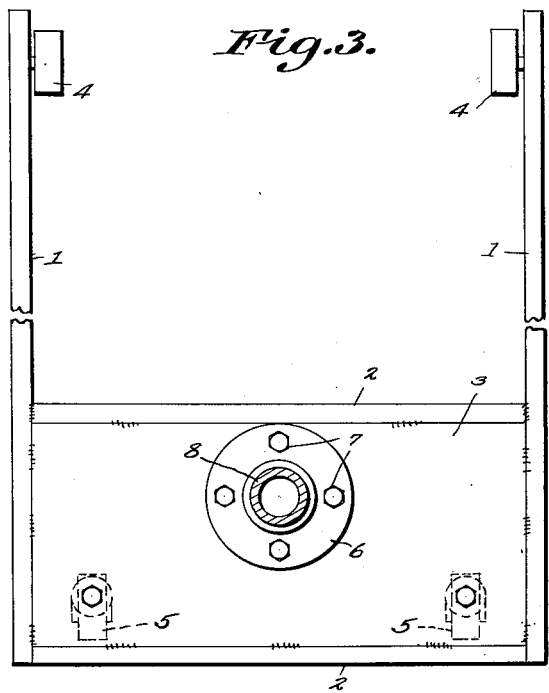
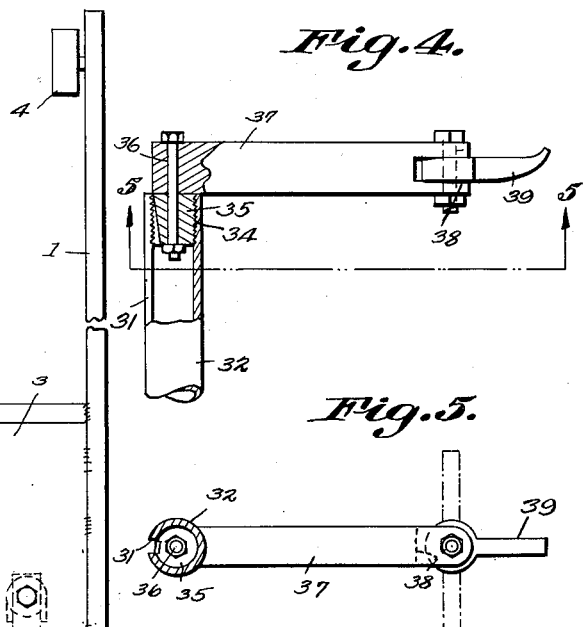
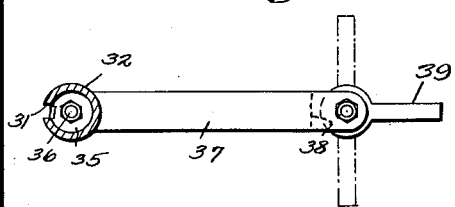
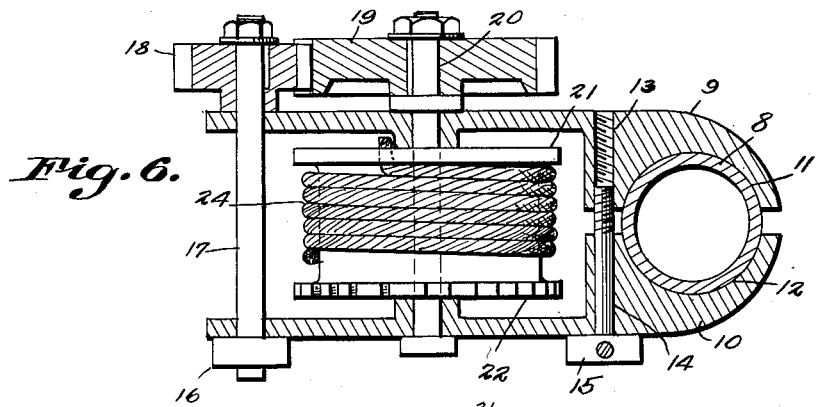
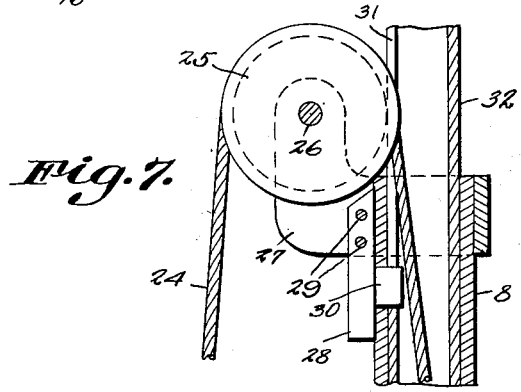
R. P. Trautner
INVENTOR
BY
ATTORNEYS.

April 14, 1953   R. P. TRAUTNER   2,634,875
HOIST
Filed Sept. 8, 1950   3 Sheets-Sheet 3
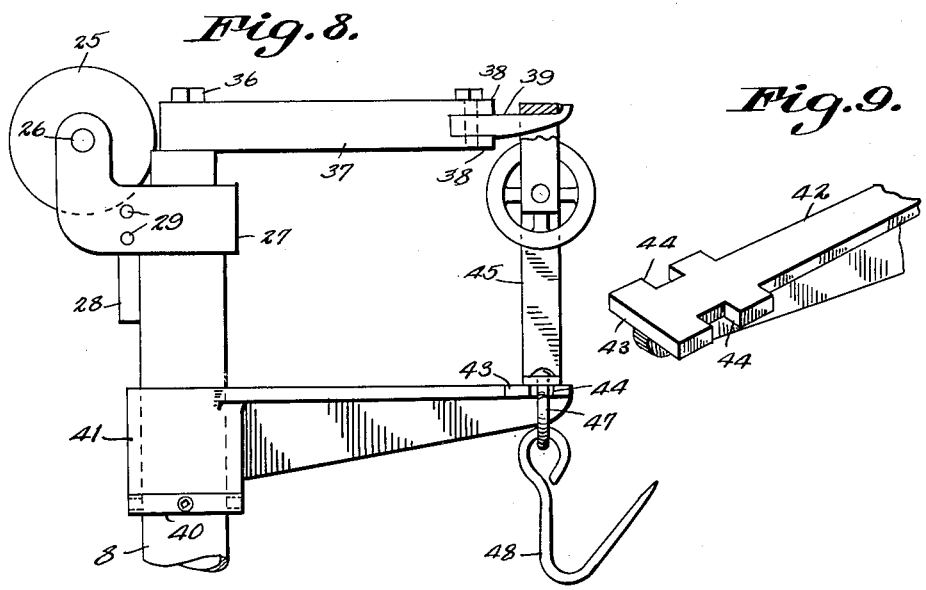
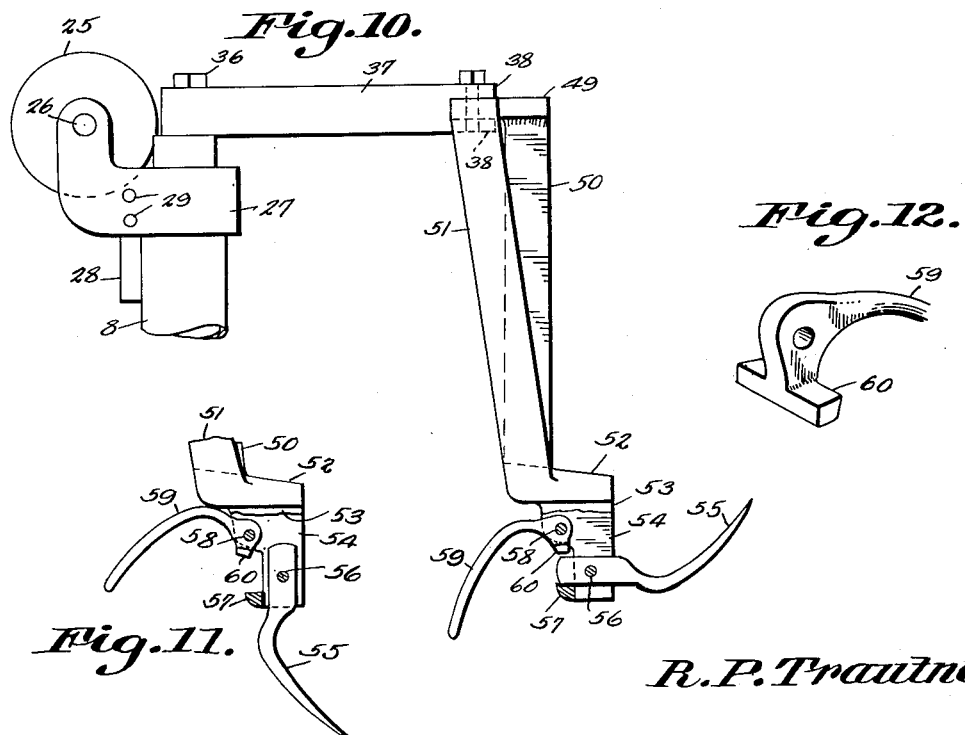
R. P. Trautner
INVENTOR
BY
ATTORNEYS.

Patented Apr. 14, 1953

2,634,875

UNITED STATES PATENT OFFICE 2,634,875

HOIST

Raymond Paul Trautner, Red Wing, Minn.

Application September 8, 1950, Serial No. 183,837

1 Claim. (Cl. 214—730)

This invention relates to a hoist, and more particularly, to a portable floor hoist used to raise and lower meat rollers or trolleys on which quarters or halves of meat carcasses are hooked, on and off high conveyor rails such as are used in food lockers and in meat packing plants.

The aim of the present invention is to provide a generally improved portable floor hoist, which will operate from a low position where carcasses can be handled more easily, will be capable of operation in narrow or otherwise limited areas, can be adjusted upwardy or downwardly with speed and ease, and will be capable of manufacture at low cost, considering the benefits to be gained from the use thereof.

Another important object is to provide, in a hoist, a means for removing meat carcasses from rollers mounted upon an overhead conveyor rail without removing said rollers from the rail.

Still another object is to provide, in a meat hoist, a construction wherein a portion of the hoist can be used to remove a meat carcass together with its roller from an overhead rail, lower it part way to the floor, transfer it to a lowering chain, and then lower the carcass the remainder of the way to the floor.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings

Figure 1 is a rear elevational view of a floor hoist constructed in accordance with the invention.

Fig. 2 is a side elevational view, the dotted lines indicating a lowered position.

Fig. 3 is an enlarged section taken substantially on line 3—3 of Fig. 1, portions being broken away.

Fig. 4 is an enlarged view partly in side elevation and partly in vertical section, through the upper portion of the hoist.

Fig. 5 is a section taken substantially on line 5—5 of Fig. 4, the dotted lines indicating different positions to which a supporting hook can be adjusted.

Fig. 6 is a section, still further enlarged, taken substantially on line 6—6 of Fig. 2.

Fig. 7 is an enlarged section taken vertically through a sheave and mounting therefor.

Fig. 8 is an enlarged side elevation of the upper portion of the hoist, equipped with a trolley transfer attachment.

Fig. 9 is a still further enlarged fragmentary perspective view of the outer end of the transfer arm.

Fig. 10 is a view similar to Fig. 8, with the upper end of the hoist equipped with another attachment shown in elevation, with portions broken away, used to lift meat carcasses from overhead trolleys.

Fig. 11 is a view in side elevation, portions being broken away showing the lower portion of the attachment of Fig. 10 in another position.

Fig. 12 is an enlarged fragmentary perspective view of a movable stop member constituting part of the attachment of Fig. 10.

Referring to the drawings in detail, a pair of elongated parallel horizontally extending channel members 1 are rigidly connected by spaced parallel transversely extending channel members 2, one of the channel members 2 connecting one end of each of the members 1, while the other channel member 2 connects the members 1 intermediate their ends (see Fig. 3) so that the space between the forward ends of the channel members 1 is completely clear, thus to permit the hoist to straddle the legs of a meat chopping block or other columnar member, thus to increase the locations to which the hoist can be moved.

Welded or otherwise rigidly secured to the members 1 and 2 is the plate 3.

Mounted at the front ends of the respective members 1 are the wheels 4, while mounted below the plate 3 are the castors 5.

Thus, it will be seen that there is provided a rollably mounted base having a recessed front end. The recessed front end can be covered if desired by another plate, not shown, whenever it is desired to permit a carcass suspended from the hoist to rest at its lower end upon the rollable platform.

A socket 6 is mounted upon the plate 3 by means of bolts 7, and seated in said socket is the upstanding tubular post 8. Intermediate the upper and lower ends of the post 8, I mount a winch mechanism which, as seen from Fig. 6, includes the opposed clamp members 9 and 10 having at their front ends the semicircular recesses 11 and 12 between which the post 8 is gripped, the clamp members 9 and 10 being clamped in adjusted position upon the post 8 by means of a fastening means including the threaded bore 13 formed in the clamp member 9, this registering with the smooth bore 14, there being extended through said bores the adjusting screw 15. From this, it will be seen that whenever it is desired to adjust the clamp upwardly or downwardly upon the post 8, it is necessary only that the adjusting screw 15 be loosened, after which the clamp is moved to the selected position, the screw 15 then being tightened once more to cause the clamp members 9 and 10 to grip the post 8 tightly.

A crank 16 is secured to one end of a shaft 17 mounted rotatably between the rearwardly extended wings of the clamp members 9 and 10, said shaft 17 being rotated by the crank 16, there being keyed to the other end of the shaft 17 the gear 18, this meshing with the larger gear 19 keyed to the shaft 20 also rotatably mounted between the wings of the clamp members. Mounted on the shaft 20 for rotation therewith is the drum 21 one side of which is formed as a ratchet 22 engageable by the pivoted pawl 23 mounted upon the clamp member 10.

From this, it will be seen that by operation of the hand crank 16, the drum 21 can be rotated as necessary, and will be held against movement from the position to which rotated by the pawl 23. The pawl 23 can be lifted whenever it is desired to permit the drum 22 to rotate in a reverse direction.

Wound upon the drum 21 is the cable 24 extending upwardly from said drum and passed over the sheave 25 rollably mounted between the spaced wings of the clamp member 27 secured to the upper end of the post 8, there being a stop 28 secured to the clamp member 27 by pins 29, the stop 28 being integrally formed with a lug 30 (Fig. 7) extended through the wall of the post 8 into the slot 31 extending the length of the inner tubular member 32, that telescopes in the post 8. The cable 24 after being passed over the sheave 25 is secured as at 33 to the lower end of said inner tubular member 32, the cable being extended through the slot 31 for this purpose. As may be noted from Fig. 7, the sheave 25 extends partially into the slot 31, so as to permit the cable 24 to clear the walls of the slot and also to clear the lug 30.

Formed in the upper end of the inner tubular member 32 are the internal threads 34 in which is threaded the plug 35 through which extends the bolt 36 whereby there is secured to the upper end of the plug the horizontally extending arm 37, this having horizontal swinging movement upon the plug. The outer end of the arm 37 is bifurcated as at 38, and between the arms of the bifurcated end 38 there is mounted, for horizontally swinging movement, the hook 39.

In use, the hoist is rolled to the location at which it is to be used, after which the crank 16 is operated to elevate the inner tubular member as necessary. As the member 32 is raised, the hook 39 engages the conventional trolley, not shown, from which is suspended the carcass, also not shown, these trolleys being rollably mounted on conveyor rails of a meat packing plant. In any event, the hook 39 lifts the trolley and the carcass suspended from the trolley completely off the conveyor rail, after which the hoist is rolled to the location at which the carcass is to be deposited.

It may be noted that the recessed front end of the rollable platform permits the hoist to be moved to positions where it straddles the legs of a meat chopping block, or other posts. This increases considerably the versatility of the device, so as to permit its movement to ordinarily inaccessible locations. Additionally, the hoist is so formed as to require a minimum of space, thus to permit the hoist to be rolled between crowded lines of carcasses and through other limited areas.

Of importance also is the fact that the hoist can be elevated a substantial distance, and additionally, the pivotal mounting of the arm 37 and also of the hook 39 permits the making of further adjustments to position the hook 39 exactly under a conveyor rail, so as to permit it to engage the meat trolleys regardless of the location of said trolleys.

Referring now to Figs. 8 and 9, there is here illustrated an attachment used upon the hoist illustrated in the preceding figures, by means of which a roller or trolley removed from on overhead rail by the hoist is capable of being lowered fully to the floor.

To this end, I provide a set collar 40 vertically adjustable upon the post 8, and capable of being fixedly secured in any position to which vertically adjusted. In the adjusted position illustrated, this attachment is located a short distance below the upper end of the post, and in most instances, this would be the position which it would normally occupy.

Supported at a selected elevation by the set collar 40 is the sleeve 41 rotatable upon the post 8, sleeve 41 being integral with a horizontally extending transfer arm 42, which is thus swingable in a horizontal plane about the post 8.

At its free end the arm 42 is formed with a flat wide portion 43 oppositely slotted as at 44.

A conventional meat roller or trolley that usually rides upon an overhead rail is illustrated at 45, and this of course does not constitute part of the present invention. At its lower end, such a trolley is conventionally formed with a lateral extension 46 supporting the depending eye 47 from which is suspended the meat hook 48.

In use of the attachment of Figs. 8 and 9, it will be assumed for the sake of example that it is decided to lift a trolley 45 from an overhead rail and lower it fully to the floor. The meat hoist is used as previously described, the hook 39 engaging under the upper end of the trolley 45, and the trolley being thereafter lifted from the overhead rail and lowered by use of the winch mechanism previously discussed.

After the trolley 45 is lifted, it is lowered to an extent as will permit the transfer support arm 42 to be swung horizontally into a position in which the eye 47 will be received in one of the slots 44, the widened end 43 being at this time located just below the lateral extension 46 at the lower end of the meat roller frame 45. The roller frame is now slightly lowered still more by the winch mechanism described. The full weight of the frame 45 is supported upon the member 42 which in effect constitutes a transfer table.

The arm 37 is now swung laterally disengaging the hook 39 from the upper end of the trolley frame 45.

A chain of proper length is now selected, not shown, this being equipped with a ring at one end and a hook upon the other end. The ring end is hung upon the hook 39 and the upper portion of the hoist is now raised by use of the winch mechanism until the hook end of the chain can enter the upper portion of the trolley frame 45. The hoist is now raised slightly to an additional extent until this chain hook carries the weight of the roller frame and supported object hung thereon, after which the arm 42 is swung away and the hoist lowered by use of the winch mechanism until the trolley frame 45 is lowered to the floor or to other desired level.

The same procedure, of course, is reversed when it is desired to raise a trolley frame 45 from the floor or other location and position it upon an overhead rail.

Considering now the attachments illustrated in Figs. 10 through 12, there is here shown a means for lifting carcasses from trolleys 45 without lifting the trolleys themselves from the overhead rail.

To this end, I remove the hook 39 entirely, and in its place, mount between the fork arms 38 the plate 49 rigidly secured to the upper ends of downwardly extending arms 50 and 51, that are rigid at their lower ends with a bottom plate 52 integrally formed with the depending extension 53 having the vertical slot 54 in the lower end of which a hook 55 is pivoted, intermediate its ends, upon a cross pin 56.

A portion of the lower end of the slot 54 is closed to provide a stop 57 located below and to one side of the pivot 56, the stop 57 engaging one end of the hook 55 when said hook is swung in one direction, as seen in Fig. 10. In this position, the hook 55 is operatively positioned to support a meat carcass or the like.

Mounted upon a cross pin 58 located above and to one side of the pivot pin 56 is a vertically swinging handle 59 integral with a cross head 60 constituting a stop vertically spaced above the lower stop 57.

The stop 60, when the parts are positioned as in Fig. 10, cooperates with the stop 57 to hold the hook 55 in the operative position illustrated.

In use of this attachment, assuming that it is desired to lift a meat carcass from a trolley 45, the hook 55, positioned as in Fig. 10, is elevated by elevation of the upper portion of the hoist in the regular manner until it engages said carcass and lifts it from the trolley.

The carcass is now transported to the location desired, and to drop the carcass upon the boning table, not shown, or other work place, the user simply grasps handle 59 and swings it upwardly as in Fig. 11. This frees the hook 55 causing it to swing downwardly under the weight of the carcass, to the position of Fig. 11, as a result of which the carcass will drop off.

In the illustrated example, manual means are employed to swing the hook 55 back up to the position of Fig. 10 where it will automatically engage under the stop 60 once more. However, I believe it is sufficiently clear as not to require special illustration that a spring or equivalent means can be employed to retain the hook 55 normally in the position shown in Fig. 10, so that the hook 55 will swing up to said position automatically whenever it is not supporting the weight of a meat carcass or the like.

What is claimed is:

A portable hoist including a rollable platform, a tubular post upstanding therefrom, a winch mechanism mounted intermediate the upper and lower ends of said tubular post, means for preventing retrograde movement of the winch mechanism, a cable wound upon the winch mechanism, a sheave at the upper end of the tubular post over which said cable is passed, an inner tubular member mounted to telescope in the post, said cable being secured to the bottom end of said inner tubular member, there being a slot extending the length of said tubular member through which said cable passes, a stop mounted upon the tubular post and extending into said slot to limit upward movement of the inner tubular member, an arm mounted for horizontal swinging movement at the upper end of said inner tubular member, the free end of said arm being bifurcated, and a meat trolley engaging hook mounted for horizontal swinging movement in the bifurcated end of said arm.

RAYMOND PAUL TRAUTNER.

References Cited in the file of this patent

UNITED STATES PATENTS

| Number | Name | Date |
|---|---|---|
| 380,640 | Turner | Apr. 3, 1888 |
| 1,013,005 | Ernst | Dec. 26, 1911 |
| 1,861,191 | Russell | May 31, 1932 |
| 2,315,873 | Richards | Apr. 6, 1943 |